US006807539B2

(12) United States Patent
Miller et al.

(10) Patent No.: US 6,807,539 B2
(45) Date of Patent: Oct. 19, 2004

(54) METHOD AND SYSTEM FOR RETRIEVING SEARCH RESULTS FROM MULTIPLE DISPARATE DATABASES

(76) Inventors: Todd Miller, 865 First Ave. Suite 15E, New York, NY (US) 10017; Brian Schelp, 16 Prince St., New Hyde Park, NY (US) 11040; Paul Duncan, 188 Pleasant View Dr., Apalachin, NY (US) 13732

(*) Notice: Subject to any disclaimer, the term of this patent is extended or adjusted under 35 U.S.C. 154(b) by 0 days.

(21) Appl. No.: 10/669,312

(22) Filed: Sep. 23, 2003

(65) Prior Publication Data

US 2004/0059728 A1 Mar. 25, 2004

Related U.S. Application Data

(62) Division of application No. 09/844,787, filed on Apr. 27, 2001, now abandoned.
(60) Provisional application No. 60/200,044, filed on Apr. 27, 2000.

(51) Int. Cl.[7] .............................................. G06F 17/00
(52) U.S. Cl. ................................. 707/3; 707/9; 707/10
(58) Field of Search ..................... 707/3–10, 100–102, 707/200–205

(56) References Cited

U.S. PATENT DOCUMENTS

| 5,859,972 | A | | 1/1999 | Subramaniam et al. | 395/200.33 |
|---|---|---|---|---|---|
| 6,032,184 | A | * | 2/2000 | Cogger et al. | 707/10 |
| 6,587,853 | B1 | * | 7/2003 | LaRue | 707/9 |
| 6,711,681 | B1 | * | 3/2004 | Al-Salqan et al. | 707/9 |

OTHER PUBLICATIONS

Goh et al., Multiparty authenticative mechanisms for network–mediated document–object conferencing and collaborative processing, TENCON 2000, Proceedings, vol. 3, Sept. 24–27, 2000, pp. 427–432, vol. 3.*

Kwong et al., Authentic publication of XML document data, Web Information Systems Engineering, 2001, Proceedings of the Second International Conference on vol. 1, Dec. 3–6, 2001, pp. 331–340, vol. 1.*

Lu et al., Secure data hiding in binary document images for authentication, Circuits and Systems, 2003, ISCAS, vol. 3, pp. III–806—II–809.*

A Unified Framework for Enforcing Multiple Access Control Policies.

On The Net—Mar. 1998, Greg R. Notess.

* cited by examiner

Primary Examiner—David Jung
(74) Attorney, Agent, or Firm—Rutan & Tucker, LLP

(57) ABSTRACT

The present invention generally relates to a method and system for retrieving search results. More particularly, the present invention relates to a method and system for retrieving search results concurrently from multiple disparate databases, whether such databases be available through the Web, or other proprietary internal networks. In an exemplary embodiment, the system includes a user interface, a control engine, and a number of translators which are used to communicate with a number of corresponding databases. During exemplary operation, a user uses the user interface to enter search term(s) and other pertinent information relating to his/her search and specify which ones of the databases are to be searched. The search term(s) and other pertinent information are then relayed to the control engine which, in turn, forwards them to the appropriate translators which correspond to the specified databases to be searched. These translators then concurrently formulate and issue their respective search requests to the corresponding databases. Concurrent searches are then carried out in the specified databases. Search results from each of the specified databases are then returned and consolidated for display by the user interface.

7 Claims, 6 Drawing Sheets

METHOD AND SYSTEM FOR RETRIEVING SEARCH RESULTS FROM MULTIPLE DISPARATE DATABASES

CROSS-REFERENCES TO RELATED APPLICATION(S)

This is a divisional of U.S. application Ser. No. 09/844,787, filed Apr. 27, 2001 now abandoned, which claims priority to Provisional Application Ser. No. 60/200,044, filed on Apr. 27, 2000, which is incorporated herein by reference.

BACKGROUND OF THE INVENTION

The introduction of the Internet and the World Wide Web ("Web") has made a voluminous amount of information available to people having access to the Web. The Web has effectively made libraries virtual in the sense that physical volumes are no longer required to reside in a single physical location. At present, some 80+ million digital forms of publications have been tied to the Web, representing trillions of pages of information. While the amount of information which appears to be available through the Web is staggering, the reality is that the majority of research-quality information is completely inaccessible using conventional information search tools such as a general-purpose search engine.

Certain information is not available via the Web using conventional information search tools because such information may be residing on proprietary databases which are not generally accessible via the Web. These proprietary databases are typically provided by commercial database providers and access to these proprietary databases is usually granted on a subscription basis. As a result, a person interested in obtaining information from these proprietary databases would have to subscribe to each database provider respectively.

Additionally, content in most publicly accessible Web databases, such as the United States Patent and Trademark Office's patent and trademark databases, are not directly accessible using conventional information search tools such as search engines from Yahoo! and Northern Light. That is, while a search engine may be able to identify and return a hyperlink or URL which corresponds to the website that contains a particular database, the search engine is not able to search for information within that particular database. Consequently, a person interested in obtaining information from such databases would have to go to the corresponding websites directly.

More significantly, database providers design their own proprietary databases using their own specific requirements and specifications. While a database typically handles access from the outside world through a database interface, such database interface varies amongst database providers. Therefore, a person interested in retrieving information from these various databases would have to access each database separately.

For example, a company, such as a law firm, may subscribe to a number of database providers in order to obtain access to different types of information. In order to provide convenient access for many individual users, access to the subscribed databases is typically provided on a company intranet via a number of clickable icons. Each icon generally represents a link which, upon activation, establishes access to a different database. As a result, a person would have to click on a corresponding icon each time access to a particular database is desired, even though the same search may be run on all the different databases.

Furthermore, even though some of the proprietary databases mentioned above also allow access from the Web via Web-enabled interfaces, each of these databases will still need to be accessed separately by a user. For example, typically, in order to access a proprietary database via the Web, a user needs to use his/her Web browser to connect to that database provider's website and then access the database via an interface. Subsequently, if the user wishes to access another proprietary database, the user then needs to leave the first database provider's website and then connect to the other database provider's website in order to access the other database. As a result, separate and sequential accesses are required if the user desires to access different databases. Therefore, it would be desirable to develop a method and system which is capable of providing efficient simultaneous access to multiple databases.

SUMMARY OF THE INVENTION

The present invention generally relates to a method and system for retrieving search results. More particularly, the present invention relates to a method and system for retrieving search results simultaneously from multiple disparate databases, whether such databases be available through the Web, or other proprietary internal networks.

According to one aspect of the present invention, one or more users are allowed to concurrently search multiple disparate databases and receive consolidated results with a single user interface through the use of a standard Web browser.

According to another aspect of the present invention, multiple databases can be searched concurrently pursuant to one single search entered by a user and the search results from the multiple databases are consolidated for display to the user.

In an exemplary embodiment, the system includes a user interface, a control engine, and a number of translators which are used to communicate with a number of corresponding databases. During exemplary operation, a user uses the user interface to enter search term(s) and other pertinent information relating to his/her search and specify which ones of the databases are to be searched. The search term(s) and other pertinent information are then relayed to the control engine which, in turn, forwards them to the appropriate translators which correspond to the specified databases to be searched. These translators then concurrently formulate and issue their respective search requests to the corresponding databases, performing any required authorization functions in the process. Concurrent searches are then carried out in the specified databases. Search results from each of the specified databases are then returned and consolidated for display by the user interface.

Accordingly, in one embodiment, a system for retrieving search results from a plurality of databases is provided, comprising: a user interface configured to receive search information; and a plurality of translators configured to retrieve search results from the plurality of databases respectively based on the search information; wherein each of the plurality of translators performs a number of authorization functions and formulates a search request using the search information and syntax information specific to its corresponding database; and wherein the plurality of translators use their respective search requests to retrieve the search results from their corresponding databases in a concurrent manner. Optionally, the system further comprises a control engine configured to forward the search information to the plurality of translators and to consolidate the search results retrieved by the plurality of translators.

Accordingly, in another embodiment, a method for retrieving search results from a plurality of databases is provided, comprising: receiving search information from a user; formulating a plurality of search requests using the search information and database syntax and protocol information, wherein each search request is recognizable by a corresponding database; executing the plurality of search requests in their corresponding databases in a concurrent manner; returning search results from the plurality of databases after execution of the plurality of search requests; and consolidating the search results for display to the user.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DESCRIPTION OF THE SPECIFIC EMBODIMENTS

Figure 1:
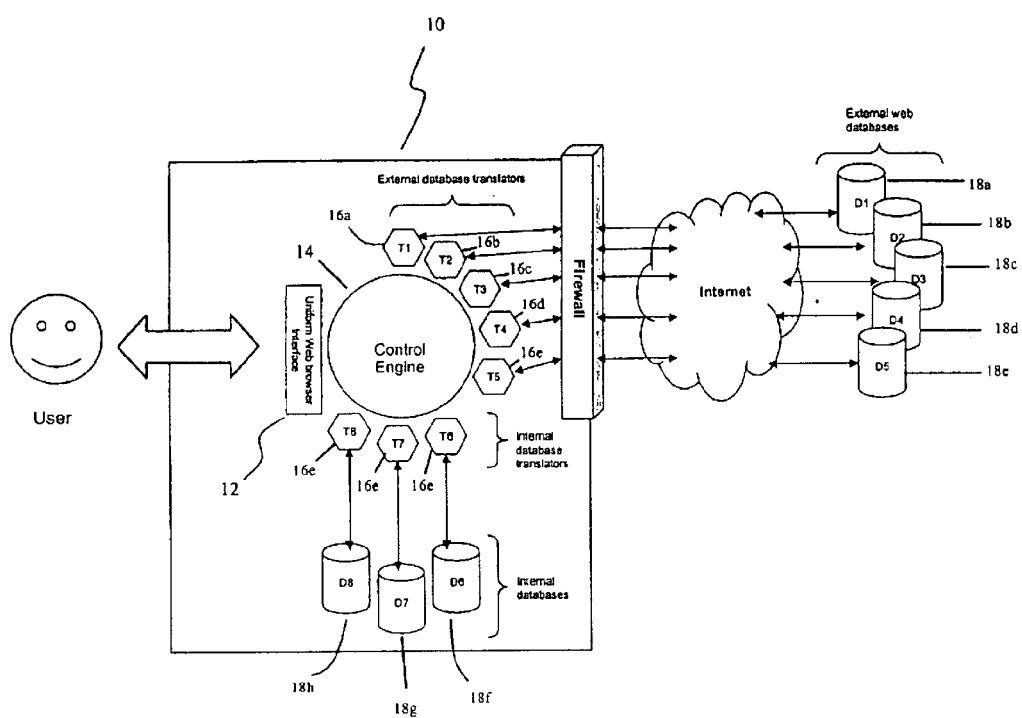
FIG. 1 is a simplified schematic diagram showing an exemplary embodiment of the present invention.

Various embodiments of the present invention will now be described. FIG. 1 is a simplified schematic diagram showing an exemplary embodiment of the present invention. In this exemplary embodiment, the system 10 includes a user interface 12, a control engine 14, and a number of translators 16a–h.

In an exemplary embodiment, the system 10 including the user interface 12, the control engine 14 and the translators 16a–h is implemented using computer software in either an integrated or modular manner. It should be understood that the system 10 may be implemented using software, hardware, or a combination of both. Based on the disclosure provided herein, a person of ordinary skill in the art should know of other ways, methods and techniques to implement the present invention.

Preferably, the system 10 resides on a single server (not shown). However, it should be understood that the system 10 need not reside on a single server. Different parts of the system 10, such as the user interface 12, the control engine 14 and the translators 16a–h may be made to reside on different servers depending on the design specifications and requirements. Furthermore, the server can be an internal server maintained by the user's company or a server maintained by the ISP of the user's company or any server that is accessible via a computer network.

Figure 2:
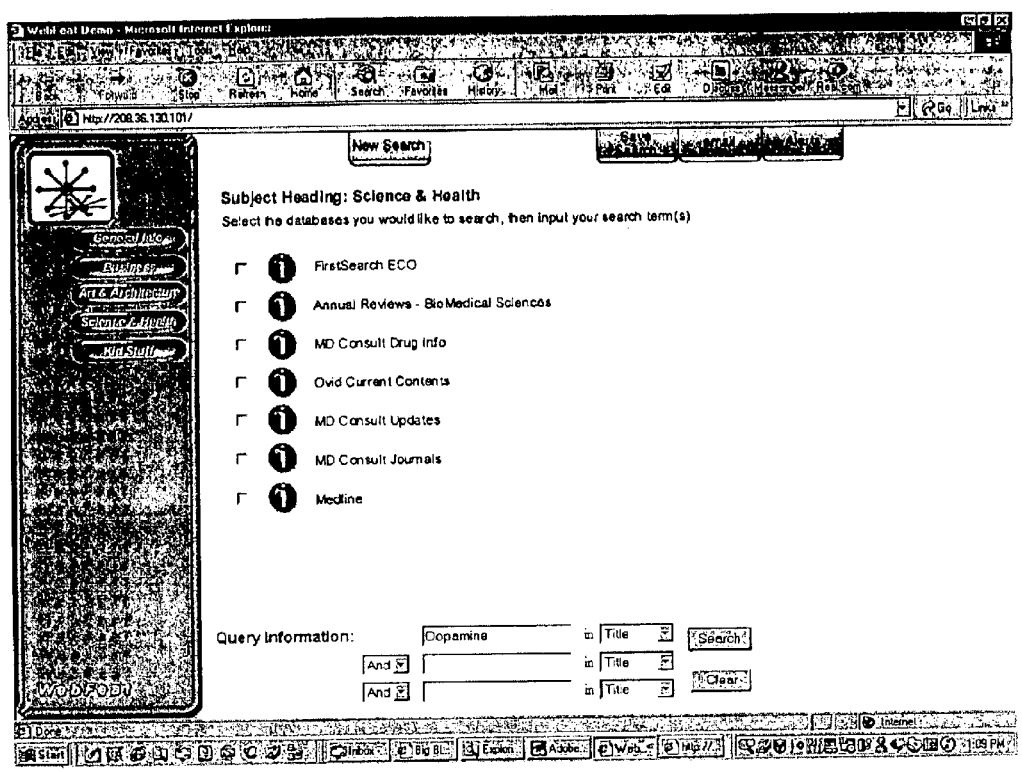
FIG. 2 is a diagram showing a first exemplary embodiment of a user interface in accordance with the present invention.

Referring to FIG. 2, an exemplary embodiment of the user interface 12 is shown. In the exemplary embodiment, the user interface 12 allows a user to enter the desired search term(s) and other pertinent information for his/her search. The user interface 12 can be designed to allow the user to select different search strategies. For example, both novice key word search and advanced multi-term Boolean search can be provided as options.

Furthermore, the user interface 12 also allows the user to select or specify one or more of the available databases where the search is to be conducted. For example, the user may specify to search databases from various database providers such as Compendex®, Derwent®, ABI Inform/ProQuest®, Disclosure, and PR Newswire. Referring to FIG. 1, the user may via the user interface 12 select or specify databases 18a–c and 18f to be searched.

By using the user interface 12, the search term(s) only need to be entered once for a single search. As a result, the user can obviate the need to repeatedly enter the same search term(s) where more than one database is to be searched. The search term(s) and other pertinent information entered by the user are then passed by the user interface 12 to the control engine 14. As will be explained further below, the control engine 14 then forwards the search term(s) and other pertinent information to each of the translators 16 which corresponds to the specified databases 18 thereby enabling the translators 16 to access the specified databases 18. For example, assuming that translators 16a–c and 16f correspond to databases 18a–c and 18f, if the user specifies to have databases 18a–c and 18f searched, then the control engine 14 forwards the search term(s) and other pertinent information to translators 16a–c and 16f.

In one embodiment, the user interface 12 is implemented using a standard web browser, such as the Microsoft® Internet Explorer®, the Netscape® Navigator®, and the like. It should be understood that while only one user interface 12 is shown herein, a multitude of interfaces 12 can be implemented to allow multiple users to conduct their respective searches concurrently. For example, the user interface 12 can be made available on a company intranet via a clickable icon. One or more users can click on the icon thereby allowing respective searches to be performed on one or more of the available databases 18a–h.

Figure 3:
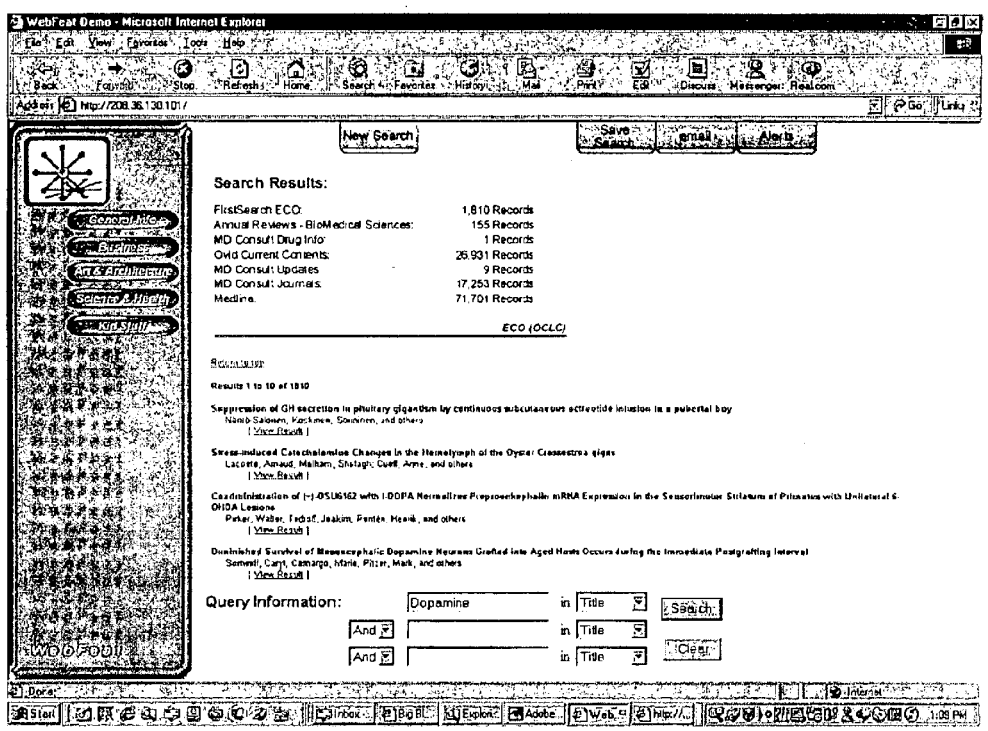
FIG. 3 is a diagram showing a second exemplary embodiment of a user interface in accordance with the present invention.

Referring to FIG. 3, the user interface 12 further displays the results of the search to the user. For example, the search results are shown to the user in a summary format using hyperlinks. Hyperlinks may be implemented using HTML but other presentation or markup languages such as DHTML, XML, etc. can be used. The results displayed to the user are consolidated results retrieved from the various specified databases. As will be explained further below, the control engine 14 receives the respective results from the translators 16a–h and consolidates such results for presentation to the user via the user interface 12.

Figure 4:
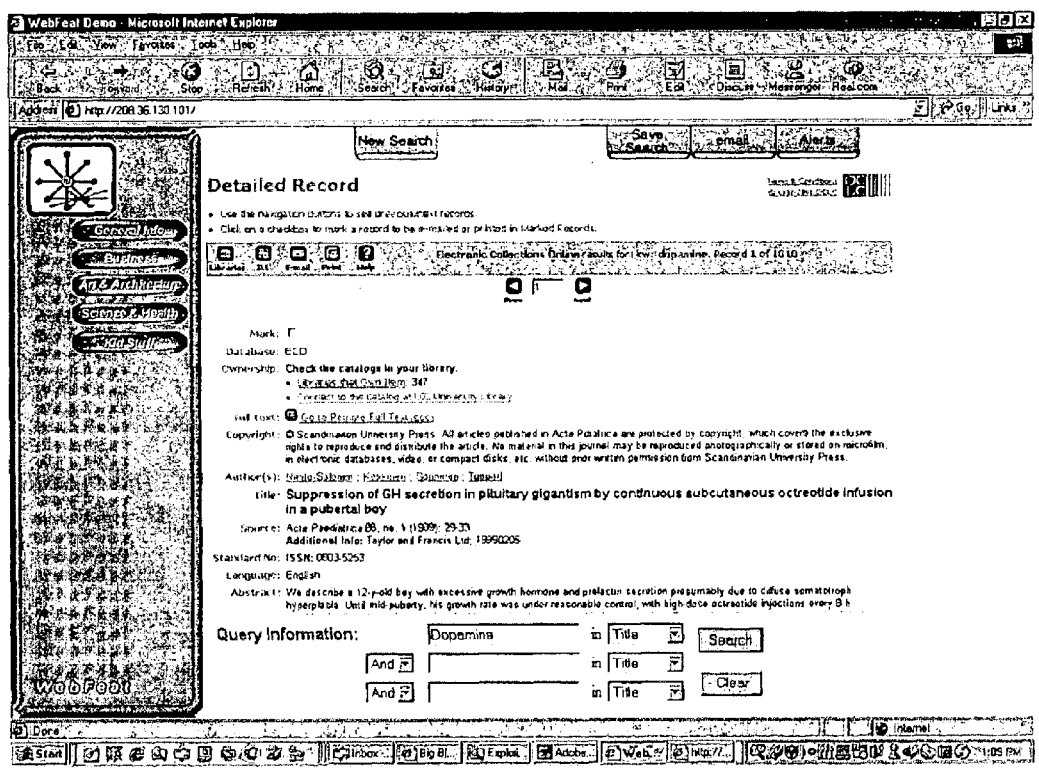
FIG. 4 is a diagram showing a third exemplary embodiment of a user interface in accordance with the present invention.

Referring to FIG. 4, the user interface 12, upon selection of a corresponding hyperlink by the user, also displays the corresponding full record of a search result to the user. As mentioned above, the search results may be shown to the user in a summary format using hyperlinks. If the user desires to learn more about a particular search result, the user may simply click on the corresponding hyperlink to view the corresponding full record. As will be explained further below, the translators 16 create the respective hyperlinks which correspond to the search results thereby allowing the user interface 12 to display the corresponding full record accordingly upon activation of the corresponding hyperlink.

In an alternative embodiment, the user interface 12 is implemented in the form of a user agent such as an application program. Similarly, the user agent is configured to receive search information and other pertinent information, either from a user or from any other source such as another application program. Furthermore, upon receiving the search results from the control engine 14, the user agent may further process such search results. Based on the disclosure provided herein, a person of ordinary skill in the art will know of ways, methods and techniques to implement the user interface 12 in accordance with the present invention.

The control engine 14 generally manages and controls operation of the system 10. As mentioned above, the control engine 14 forwards the search term(s) and other pertinent information received via the user interface 12 to all translators 16 which correspond to the specified databases 18. In an exemplary embodiment, the control engine 14 is multi-threaded, which means that a new thread of execution is spawned to run a search for each of the specified databases 18a–h. By having the multi-threaded functionality, the control engine 14 allows multiple searches to be run in parallel. That is, all search requests to the respective specified databases 18a–h can be formulated and executed concurrently. In one embodiment, the control engine 14 is implemented using Microsoft's Visual C++. However, based on the disclosure provided herein, it should be apparent to a person of ordinary skill in the art that other computer languages, such as JAVA, can be used to implement the control engine 14 in accordance with the present invention.

The control engine 14 consolidates all the results received from the translators 16a–h. The consolidated results represent the collective search results retrieved from the various specified databases 18a–h. Preferably, the consolidated results are formatted using presentation or markup language such as HTML. The consolidated results are then forwarded to the user interface 12 to effectuate the appropriate display accordingly.

Access to the specified databases 18a–h is accomplished via the translators 16a–h. Each translator 16 is tailored specifically to interact with a corresponding database 18. The databases 18a–h which correspond to the translators 16a–h can either be Web-accessible or locally accessible. For example, referring to FIG. 1, databases 18a–e are accessible via the Web and databases 18f–h are databases which are connected to a company's internal network and are not accessible to the outside world.

As mentioned above, each database is accessed via a database interface. Such database interface is typically different for each database. For example, for Web-accessible databases, these databases may have database interfaces which are capable of handling communications and interface protocols such as HTTP, telnet, Z39.50 or others; and for locally accessible databases, these databases may have database interfaces which are capable of handling communications and interface protocols such as Microsoft®'s ODBC standard or other vendor specific standards. It should be noted that a database interface can be implemented in various forms. For example, a database interface can be a search engine or other searching mechanism which can be used to search or access a database. A person of ordinary skill in the art will know of ways, methods and techniques to implement a, database interface.

Since each translator 16 is tailored to interact with a corresponding database 18, each translator 16, therefore, contains specific known information about the corresponding database interface including, for example, information relating to log-ins and search request syntax and format. The specific information about the corresponding database interface can be obtained, for example, by identifying different words, terms and formatting code used in a response received from the corresponding database. For instance, such information may be obtained from a HTTP response received from a database interface which is Web-accessible. The specific information about a corresponding database interface can also be obtained from the database providers or other sources.

Using the information, such as the search term(s), received from the user via the user interface 12 and the specific information pertaining to a corresponding database interface, the translator 16 first contacts the corresponding database interface to perform any required steps to satisfy database authorization requirements in order to establish a connection to the corresponding database 18. Once the connection is established, the translator 16 then formulates a search request which is recognizable by that corresponding database 18. In an exemplary embodiment, the translator 16 uses HTTP to establish the database connection and transmit the search request to that corresponding database 18. Referring to FIG. 1, for example, translator 16a can forward a search request to corresponding database 18a using HTTP via the Internet.

After the corresponding database 18 performs the search pursuant to the search request, the search results are returned to the corresponding translator 16. Similarly, in an exemplary embodiment, the search results are encoded using HTML. It should be understood that the search results can be encoded in other presentation or markup language and that the corresponding database 18 and translator 16 can communicate with one another using other communications and interface protocols.

After the search results are returned from the corresponding database 18, the translator 16 parses the search results to create a number of summary statistics and records and corresponding hyperlinks. The summary statistics and records and the corresponding hyperlinks are then forwarded to the control engine 14. The summary statistics and records and the corresponding hyperlinks are formatted using HTML, DHTML, XML or other appropriate markup language.

As described above, the control engine 14 consolidates the summary statistics and records and the corresponding hyperlinks received from all the translators 16a–h. The consolidated results are then forwarded to the user interface 12 to generate the appropriate display. The consolidated results represent the collective search results retrieved from the various specified databases.

Figure 5:
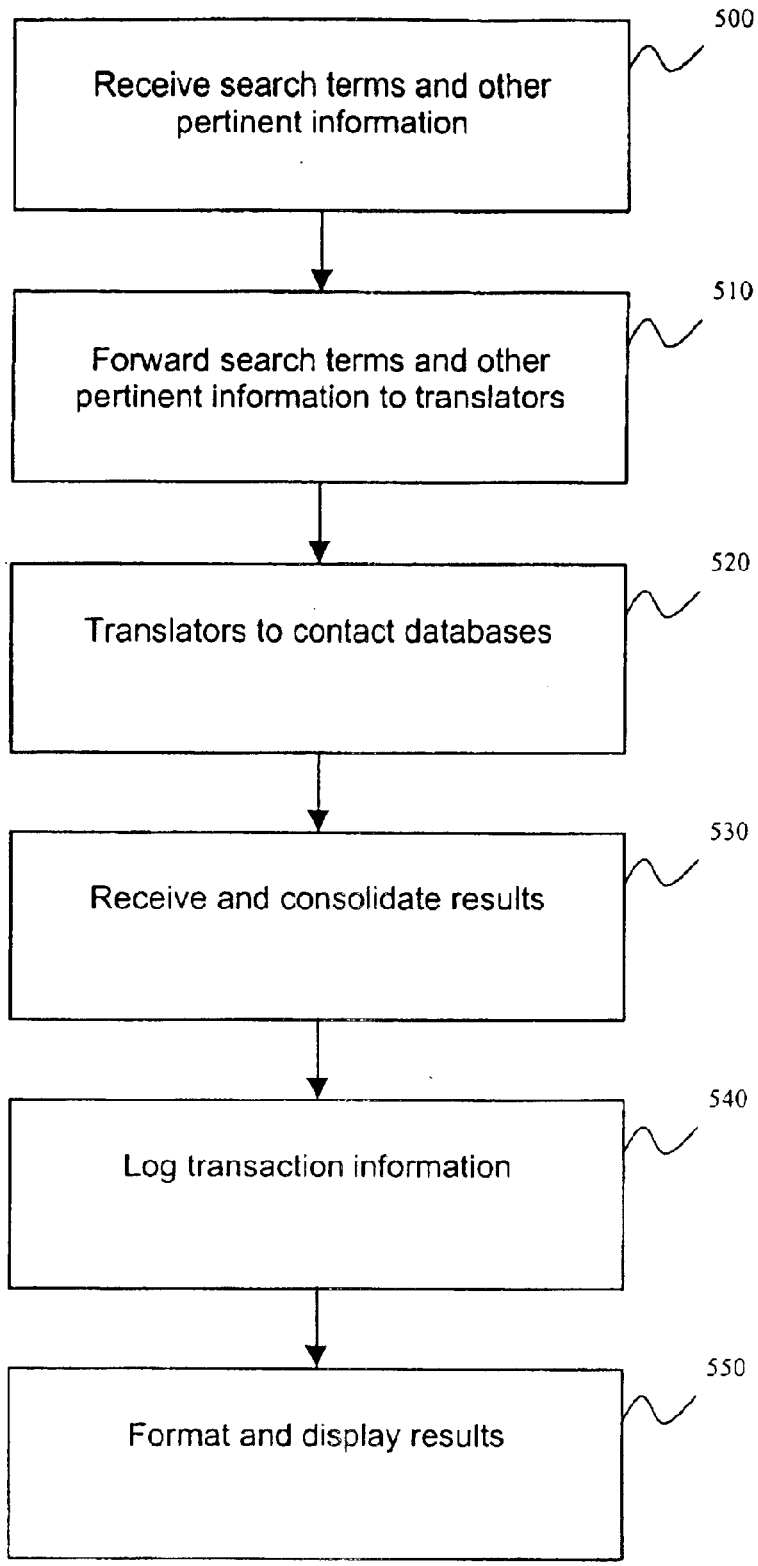
FIG. 5 is a simplified flow diagram illustrating operation of an exemplary embodiment of the present invention.

FIG. 5 is a simplified flow diagram illustrating operation of the system 10. At 500, the user via the user interface 12 provides the search term(s) or search query and other pertinent information and specifies which ones of the available databases 18a–h are to be searched. For example, the user can specify that databases 18a–c are to be searched.

At 510, the control engine 14 forwards the search term(s) and other pertinent information to the appropriate translators 16 which correspond to the specified databases 18. For example, if the user specifies that databases 18a–c are to be searched, then translators 16a–c receive the search term(s) and other pertinent information from the control engine 14.

At 520, the appropriate translators 16 contacts and forwards the search term(s) and other pertinent information to their respective specified databases 18 so as to enable searches to be performed in the specified databases 18. Additional details of this step is further provided below.

At 530, search results are received from the specified databases 18 by the corresponding translators 16. After receiving the respective search results from the corresponding databases 18, each translator 16 parses and tallies the search results returned from its corresponding database 18 and generate any desired summary statistics and records and corresponding hyperlinks. Summary statistics may include, for example, number of search results retrieved from each database 18. The translators 16 then forward the respective summary statistics and records and corresponding hyperlinks to the control engine 14. The control engine 14 consolidates such summary statistics and records and corresponding hyperlinks and forwards the consolidated results to the user interface 12.

At 540, the control engine 14 also logs and records all the transaction information to a transaction log.

At 550, the user interface 12 displays the consolidated results accordingly.

Figure 6:
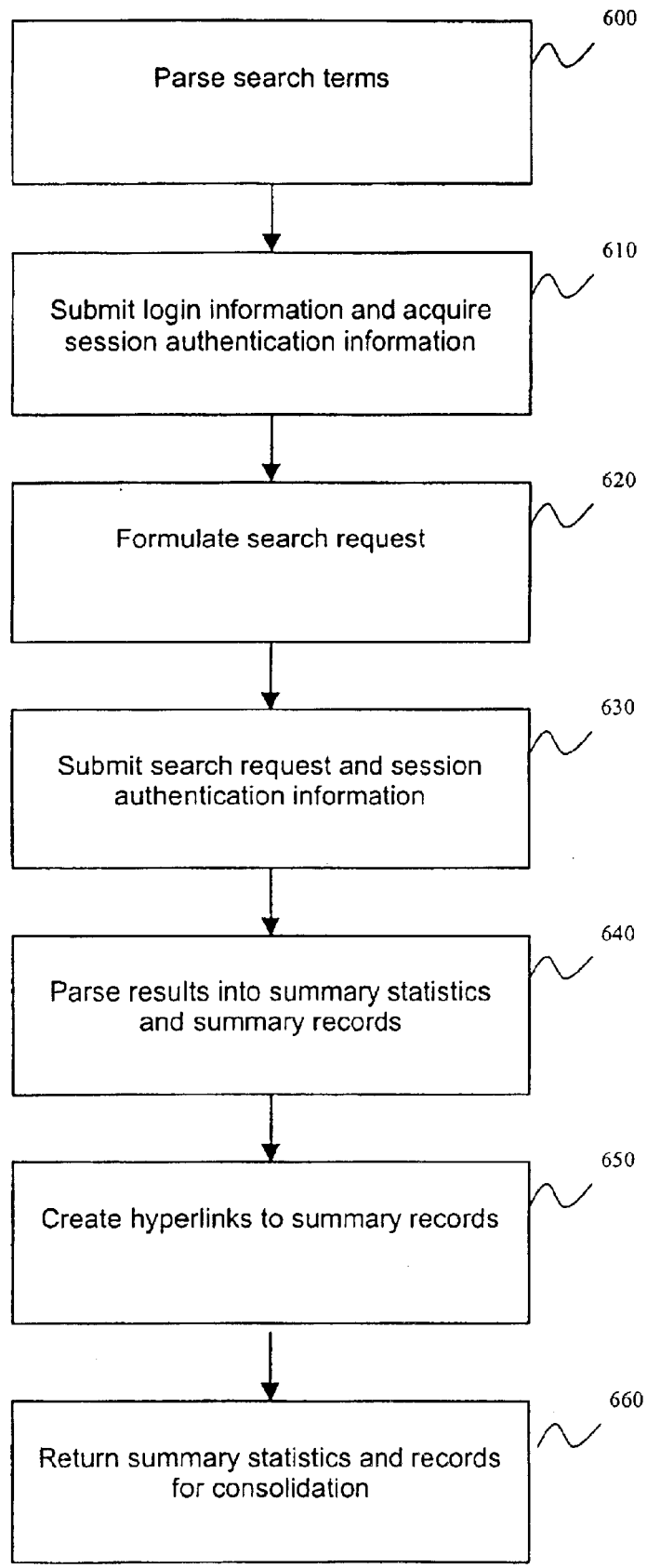
FIG. 6 is a simplified flow diagram further illustrating one aspect of operation as shown in FIG. 5.

FIG. 6 is a simplified flow diagram which further illustrates the operation of step 520 for each appropriate translator 16. At 600, a translator 16 parses the search term(s) received from the control engine 14.

At 610, the translator 16 submits specific login and authorization information in order to establish access to the database interface of the corresponding database 18. Upon verification of the login and authorization information, session authentication information is returned to the translator 16.

At 620, upon verification of the login information and establishing access, the translator 16 then incorporates the search term(s) and other pertinent information into a search request which is recognizable by the corresponding database 18. As mentioned above, the search request is formulated specifically so as to allow it to be understood by the database interface of the corresponding database 18.

At 630, the search request and the session authentication information are transmitted to the database interface of the corresponding database 18. The search request is then carried out in the corresponding database 18.

At 640, search results are returned from the corresponding database 18 to the translator 16. The translator 16 parses the results into summary statistics and records. In an exemplary embodiment, the summary statistics and records are formatted in HTML.

At 650, the translator 16 further creates a number of hyperlinks which are linked to the summary records respectively. In the event that a summary record also has a corresponding full record, a hyperlink is also created to link the summary record and the corresponding full record together.

At 660, the translator 16 returns the summary statistics and records and all the created hyperlinks to the control engine 14 for consolidation with other summary statistics and records and hyperlinks received from other translators 16.

The following example further illustrates the operation of the system 10. Referring to FIG. 1, assume that translators 16a–h are tailored specifically to interact with databases 18a–h respectively. A user via the user interface 12 enters the desired search term(s) and other pertinent information and specifies that the search be conducted in databases 18a–c and 18f.

The control engine 14 then forwards the search term(s) and other pertinent information to translators 16a–c and 16f. Upon receiving the search term(s) and other pertinent information, translators 16a–c and 16f first concurrently contact database interfaces of databases 18a–c and 18f respectively to establish access connections.

When the access connections are established, translators 16a–c and 16f each perform necessary authorization steps so as to ensure that searches in the corresponding databases 18a–c and 18f can be conducted. Translators 16a–c and 16f then each incorporate the search term(s) and other pertinent information into a search request which is recognizable by their respective databases 18a–c and 18f. For example, the search request generated by translator 16a may utilize HTTP if database 18a is HTTP compatible; the search request generated by translator 16b may utilize telnet if database 18b is accessed using telnet; the search request generated by translator 16c may utilize Z39.50 if Z39.50 is used to access database 18c; and the search request generated by translator 16f may utilize ODBC if database 18f is designed using ODBC.

The search requests generated by translators 16a–c and 16f are then carried out in the respective databases 18a–c and 18f The search results from each of the databases 18a–c and 18f are then returned to translators 16a–c and 16f respectively.

Each of translators 16a–c and 16f then parses the search results into summary statistics and records. In the event that there is a corresponding full record associated with a summary record, a hyperlink is created to link the summary record and the corresponding full record together. Translators 16a–c and 16f then forward all their respective summary statistics and records and hyperlinks to the control engine 14 for consolidation and display by the user interface 12.

In an exemplary embodiment, the system 10 further manages and controls authentication when databases 18a–h are accessed by the translators 16a–h. Each of the translators 16a–h, before submitting a search request to its corresponding database, needs to establish an authenticated session with that database. The translator 16 performs the required sequence of page fetches, cookie management, and session ID management required to authenticate. Each database 18 is different and the translator 16 meets the specific requirements for that database. Sometimes this is simple, such as a userID/password login, and sometimes it can be quite complex involving a series of multiple Web page requests with both session IDs and cookies involved. The authentication process is executed without any user interaction.

The translator 16 can perform the authentication task much faster than a user with a browser would be able to because of a variety of optimizations used by the translators 16. These include ignoring nonessential Web page elements such as graphics, extraneous frames, etc.; the avoidance of nonessential steps that users otherwise would go through; caching of authentication information for multiple queries; and use of various network transaction optimizations such as redirect truncation, persistent connections, etc.

Translators 16 are designed to handle those databases 18 that provide both userID/password and IP authentication to meet different client needs. IP authentication is a mechanism by which the database only accepts connections from clients with specific Internet addresses such as a library or corporate network used by a subscriber. Thus the same translator 16 can be used in one environment that uses userIDs and passwords, and in a different environment where IP authentication is used. One search may involve the simultaneous use of several translators 16 using a variety of userID/password and IP authenticated mechanisms. This is all done in a manner that is totally transparent to the user.

In another exemplary embodiment, the system 10 includes an authentication manager. The authentication manager provides a means to access user authentication information stored in a central database. This enables, for example, a user to authenticate once to the system 10 using his/her library card number. The authentication manager then accesses a central database to acquire authentication information used to gain database access on the user's behalf. As a result, the system 10 is able to not only control access by users but to authenticate them in an appropriate manner to the various databases 18a–h.

In addition, the system 10 allows subsequent user requests such as fetching and displaying the next group of search results and fetching and displaying the full text for a selected search result. Like the original search, these activities need to incorporate proper authentication. The original search generates the session IDs and cookies for authentication and the translator 16 builds hyperlinks to the next-set and full-text resources using the authentication information. This is unlike the native direct database search where a single client session interacts with the database 18. Instead, the system 10 is working on behalf of many users in order to manage the authentication information for all the users simultaneously. This is accomplished by routing the next-set and full-text links back through the translator 16 and attaching the authentication information as extra link parameters. By attaching session information to the link, the system 10 is able to correctly manage large numbers of simultaneous sessions.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A searching system comprising computer software that transparently and automatically manages one or more disparate authorization steps, including:

authentication and session management, required for one or more users to access, query and retrieve and display results concurrently from multiple licensed information resources or databases, wherein the session management comprises:

a first set of sub-session managements which authenticate by user basis to licensed information resources or to databases; and a second set of sub-session managements which authenticate by system basis to licensed information resources or to databases.

2. The searching system of claim 1, wherein the software is further configured to provide a summary of at least some of the responses to the specific user.

3. The searching system of claim 1, wherein at least some of the responses from said licensed information resources or databases provide access to full records or full-text resources, and the software is further configured to transparently and automatically manage one or more disparate authorization steps, including authentication and session management, required to access and display at least some of the full record or full-text resources.

4. The searching system of claim 1, wherein the software communicates with multiple licensed information resources or databases using an interface protocol selected from a group including HTTP, telnet, Z39.50 and ODBC.

5. The searching system of claim 2, wherein the summary includes a markup language selected from a group including HTML, DHTML, and XML.

6. The searching system of claim 1, wherein the software parses the results into summate statistics and records, which are logged and recorded into a transactionlog.

7. The searching system of claim 1, wherein the user can be a person or an organization or a user group.

* * * * *